United States Patent
Jenkinson et al.

(10) Patent No.: US 9,576,209 B2
(45) Date of Patent: Feb. 21, 2017

(54) ROBOTIC DEVICE TESTER

(71) Applicant: T-Mobile USA, Inc., Bellevue, WA (US)

(72) Inventors: David Jenkinson, Bellevue, WA (US); Bobby Lee, Bellevue, WA (US); Gavin Liaw, Bellevue, WA (US)

(73) Assignee: T-Mobile USA, Inc., Bellevue, MA (US)

( * ) Notice: Subject to any disclaimer, the term of this patent is extended or adjusted under 35 U.S.C. 154(b) by 0 days.

(21) Appl. No.: 14/838,154

(22) Filed: Aug. 27, 2015

(65) Prior Publication Data

US 2015/0371099 A1    Dec. 24, 2015

Related U.S. Application Data

(63) Continuation of application No. 14/281,745, filed on May 19, 2014, now Pat. No. 9,138,896, which is a
(Continued)

(51) Int. Cl.
  *G05B 15/00*    (2006.01)
  *G05B 19/00*    (2006.01)
  (Continued)

(52) U.S. Cl.
  CPC ............. *G06K 9/03* (2013.01); *B25J 9/0096* (2013.01); *B25J 9/1697* (2013.01); *B25J 11/00* (2013.01);
  (Continued)

(58) Field of Classification Search
  CPC .......... B25J 11/00; B25J 9/1697; B25J 9/1656
  (Continued)

(56) References Cited

U.S. PATENT DOCUMENTS 5,365,597 A * 11/1994 Holeva .................. B07C 3/14
                                                          382/106
6,008,636 A * 12/1999 Miller ................... G01R 31/01
                                                          324/757.01
(Continued)

FOREIGN PATENT DOCUMENTS

CN         1976526       6/2007
JP       2001-268202     9/2001
(Continued)

OTHER PUBLICATIONS

Japanese Office Action issued in Japanese Patent Application No. 2013-136319, dated Jun. 23, 2014.
(Continued)

*Primary Examiner* — Harry Oh
(74) *Attorney, Agent, or Firm* — Lee & Hayes, PLLC

(57) ABSTRACT

A system, method, and device may include software and hardware which simplify and quicken configuration of the system for testing a device, enhance testing procedures which may be performed, and provide data via which to easily discern a cause and nature of an error which may result during testing. A camera may capture still images of a display screen of a tested device and another camera may capture video images of the tested device and a partner device. A wizard may be used to generate a configuration file based on one previously generated for a similar device. A mount for a tested device may be structured so that: it is suitable for mounting thereon a plurality of differently structured devices; and adjustments in a vertical direction and a horizontal direction in a plane and adjustments of an angle of the device relative to the plane may be easily made.

17 Claims, 14 Drawing Sheets

Related U.S. Application Data continuation of application No. 13/832,436, filed on Mar. 15, 2013, now Pat. No. 8,768,515, which is a continuation of application No. 12/239,271, filed on Sep. 26, 2008, now Pat. No. 8,761,938.

(60) Provisional application No. 61/046,355, filed on Apr. 18, 2008.

(51) Int. Cl.

| | | |
|---|---|---|
| *G06K 9/03* | (2006.01) | |
| *B25J 9/16* | (2006.01) | |
| *B25J 11/00* | (2006.01) | |
| *H04M 1/24* | (2006.01) | |
| *B25J 9/00* | (2006.01) | |
| *B25J 19/02* | (2006.01) | |
| *G06K 9/20* | (2006.01) | |

(52) U.S. Cl.
CPC ............ *B25J 19/021* (2013.01); *G06K 9/2027* (2013.01); *H04M 1/24* (2013.01); *Y10S 901/02* (2013.01); *Y10S 901/47* (2013.01)

(58) Field of Classification Search
USPC ......................................................... 700/259
See application file for complete search history.

(56) References Cited

U.S. PATENT DOCUMENTS

| | | | | |
|---|---|---|---|---|
| 6,433,867 | B1* | 8/2002 | Esquivel | G01N 21/8806 356/237.2 |
| 6,983,067 | B2* | 1/2006 | Cox | G09G 3/006 324/760.01 |
| 7,167,197 | B2 | 1/2007 | Hill et al. | |
| 7,831,337 | B2* | 11/2010 | Greenspan | B25J 9/1697 473/1 |
| 8,254,908 | B2* | 8/2012 | Lee | G06F 11/2294 455/419 |
| 2003/0179296 | A1* | 9/2003 | Hill | H04N 17/04 348/189 |
| 2004/0179008 | A1* | 9/2004 | Gordon | G06F 3/011 345/419 |
| 2005/0135972 | A1* | 6/2005 | Lemme | G01N 1/312 422/400 |
| 2005/0222690 | A1* | 10/2005 | Wang | H04M 1/24 700/17 |
| 2005/0244049 | A1* | 11/2005 | Onishi | G06T 7/001 382/141 |
| 2006/0111811 | A1* | 5/2006 | Okamoto | B25J 5/007 700/214 |
| 2007/0281734 | A1* | 12/2007 | Mizrachi | H04M 1/24 455/550.1 |
| 2009/0265035 | A1* | 10/2009 | Jenkinson | B25J 9/1697 700/259 |

FOREIGN PATENT DOCUMENTS

| | | |
|---|---|---|
| JP | 2003-124871 | 4/2003 |
| JP | 2007-214925 | 8/2007 |
| WO | 2005071930 | 8/2005 |

OTHER PUBLICATIONS

Chinese Office Action mailed Jan. 29, 2016 for Chinese patent application No. 201310368737.4, a counterpart foreign application of U.S. Pat. No. 8,761,938, 14 pages.

Chinese Office Action issued in corresponding Chinese Patent Application No. 201310368737.4 dated Jan. 29, 2016.

Korean Office Action mailed Jul. 5, 2016 for Korean Patent Application No. 10-2015-7007064, a counterpart foreign application of U.S. Pat. No. 8,761,938, 6 pages.

\* cited by examiner

ROBOTIC DEVICE TESTER

CROSS-REFERENCE TO RELATED APPLICATION

The present application is a continuation of U.S. patent application Ser. No. 14/281,745, filed on May 19, 2014, which is a continuation of U.S. patent application Ser. No. 13/832,436 filed on Mar. 15, 2013 and issued as U.S. Pat. No. 8,768,515, which is a continuation of U.S. patent application Ser. No. 12/239,271 filed on Sep. 26, 2008 and issued as U.S. Pat. No. 8,761,938, which claims the benefit of U.S. Provisional Patent Application Ser. No. 61/046,355 filed on Apr. 18, 2008. The entireties of each of the above-identified patents and applications are incorporated herein by reference.

BACKGROUND

Numerous devices, and particularly handheld communication devices, such as mobile telephones, are often manufactured and updated. Each such device requires testing of the device's hardware, software, and communications functionality during and subsequent to the development and design of the device and prior to large scale production and distribution of the new device or of new software to run on a new or legacy device.

Conventional testing systems expose and access internal interfaces of a tested device in order to simulate operation of the device according to predetermined test sequences that have been input. However, such operation of the tested device is insufficient since it does not accurately reflect how the device is ultimately used, i.e., by button presses or actuation of other input hardware, such as scroll bars, wheels, or joy sticks. Further, in case of a failure, an operator may have difficulty determining, e.g., for troubleshooting purposes, the precise failure or its cause if the failure occurs during a long unattended test run. Additionally, with respect to communications, the test is incomplete because communication results at a receiving device, to which a communication from the tested device is transmitted during the test, are unknown and because receipt by the tested device of a communication from another device is not tested.

Other conventional testing systems provide a robotic arm for performing button presses to simulate use of the tested device. A camera may capture screenshots or short videos of the tested device during the test sequence which may be helpful for troubleshooting. However, even these systems are deficient because of their inability to allow for determining results at another receiving device and their inability to test the tested device's functionality upon receipt of a communication from another device.

Additionally, conventional testing systems require tedious and detailed configuration and calibration for each different tested device. This is further exacerbated when a first tested device is removed from the testing system, e.g., to fix a glitch, and then returned to the testing system after testing of a second tested device, for which the testing system was configured after the initial test of the first tested device. This scenario would require a second configuration of the testing system for the second test of the first tested device.

SUMMARY

Embodiments of the present invention provide a device, system, and method that address each of the deficiencies described above with respect to conventional device testing systems. Embodiments of the present invention may be applied to both hardware and software stress testing. A device testing system may include a robotic arm for operating a tested device and may include an arrangement for operating a second non-tested device to communicate with the tested device, including transmitting messages or initiating a call to the tested device. A first camera may be provided for recording snapshots of a display screen of the tested device and a second camera may be provided for capturing videos of the tested device as a whole and the second non-tested device, both of which being in the viewing range of the second camera.

The above functionality may be a primary utilization of the first and second cameras. In an alternative example embodiment, however, both cameras take snapshots, both cameras take video, or both cameras take both snapshots and video. In yet another alternative example embodiment, the first camera takes video while the second camera takes snapshots.

A wizard may be included for facilitating a quick configuration of the testing system for each tested device. The wizard may reference a previously stored set of input test scenarios for application to various tested devices. The wizard may further refer to configuration files associated with a previously tested device for generating a new association of some or all of the files with a new tested device. The files newly associated with the new tested device may be further modified to customize the files to the features of the new tested device.

Configuration of the testing system may include recordation of three dimensional coordinates for each or one or more buttons or other input devices, e.g., joy stick, trackball, thumbwheel, switch, etc., of the tested device. Two of the coordinates may represent a two-dimensional position of the input device on a plane of the tested device. The third coordinate may represent a position to which the input device is to be moved, e.g., in a direction perpendicular to the two-dimensional plane, in order for the tested device to register actuation of the input device and to do so without over-extending the input device or a plane of the tested device, e.g., by too hard of a button press. For an input device of the tested device for which the three dimensional coordinates are to be recorded, after coordinates representing a two-dimensional plane are input, the device testing system may automatically determine and record the coordinate of the third dimension based on signals obtained from a force sensor during movement of the robotic arm in the direction perpendicular to the input plane.

The device testing system may include a single main workstation in which to perform the testing configuration and to perform the subsequent testing. The device testing system may also include a second workstation which may be less complex than the main workstation, e.g., by omission of some of the software and/or hardware, such as omission of the robotic arm. According to this embodiment, some of the configuration of the device testing system for testing the tested device may be performed using the second less complex workstation. This may be advantageous since it may provide flexibility such as to allow for collaboration by a group of operators for performing the configuration, each operator at a separate location, e.g., at the operator's own desk or at home, instead of at a main testing location at which the main workstation is located. It may be required to perform some of the configuration steps using the main workstation. Subsequent to the configuration, the tested device may be transferred to the main workstation for testing according to the configuration, part of which may have been performed at the secondary location.

According to an example embodiment of the present invention, for each tested device for which the device testing system is configured, a unique code may be stored. The code may be associated with a configuration file to be used for testing of the tested device. At any time, the device testing system may be reconfigured for a previously tested device by input of the code. Further, so as to allow for quick reconfiguration without any user input, each code may encoded in barcode format. Each tested device or a fixture to which the device is attached for the testing of the device may be marked by the barcode. At the beginning of a test sequence, a camera of the testing device may capture an image of the tested device and/or fixture, match the barcode to one stored in a testing system, e.g., in a database or other file structure, such as a directory tree of phone configurations, and automatically load the configuration associated with the imaged barcode.

According to an example embodiment of the present invention, a device fixture includes an attachment plate having: a middle bore extending therethrough; and, on each of at least two sides of the middle bore, a respective lip, at least a portion of the lip extending along at least a portion of the bore on at least two sides of the bore. The device fixture further includes a base including a wide base and a narrow base above the wide base, the base slidably coupled to the attachment plate, the wide base extending underneath the at least two lips and the narrow base extending between the at least two lips. The device fixture further includes a first vertical plate extending upward from a surface of the narrow base which is parallel to a surface of the attachment plate through which the two elongated bores and the middle bore extends, the first vertical plate having at least two bores extending from a surface of the first vertical plate and in a direction perpendicular to a direction in which the first vertical plate extends from the narrow base. The device fixture further includes a second vertical plate having: a curved bore extending therethrough and being slidably coupleable to the first vertical plate via coupling into the at least two bores of at least two fasteners extending through the curved bore; and a structure having a shape and extending from a surface of the second vertical plate that is, when the second vertical plate is coupled to the first vertical plate, parallel to the surface of the narrow base from which the first vertical plate extends. The device fixture further includes a mounting plate having; a first bore in a shape that corresponds to the shape of the structure of the second vertical plate, the structure of the second vertical plate being slidably receivable into the first bore of the mounting plate for coupling of the second vertical plate to the mounting plate; and at least one second bore extending from a surface of the mounting plate that is, when the mounting plate is coupled to the second vertical plate and the second vertical plate is coupled to the first vertical plate, perpendicular to the surface of the narrow base from which the first vertical plate extends, and to the first bore, the coupling of the mounting plate to the second vertical plate being tightenable insertion of at least one fastener through the at least one second bore to the structure of the second vertical plate extending through the first bore.

In an example embodiment, the device fixture further includes a base plate having a plurality of bores extending from a surface of the base plate, where the attachment plate has two elongated bores extending through the attachment plate, each of the elongated bores at a respective one of two opposite sides of the attachment plate, the middle bore extending between the two elongated bores, and where the attachment plate is coupleable via coupling into two of the plurality of bores of two respective fasteners extending respectively through respective ones of the two elongated bores in a direction perpendicular to the surface of the narrow base from which the first vertical plate extends.

In an example embodiment of the described device fixture, the shape of the structure is an elongated T shape.

In yet a further variant of the immediately preceding example embodiment, the at least one second bore includes three bores.

In an example embodiment, the device fixture further includes an adhesive on a surface of mounting plate that is perpendicular to the surface from which the at least one second bore of the mounting plate extends and that is, when the mounting plate is coupled to the second vertical plate and the second vertical plate is coupled to the first vertical plate, parallel to the surface of the narrow base from which the first vertical plate extends.

DETAILED DESCRIPTION

Figure 1A:
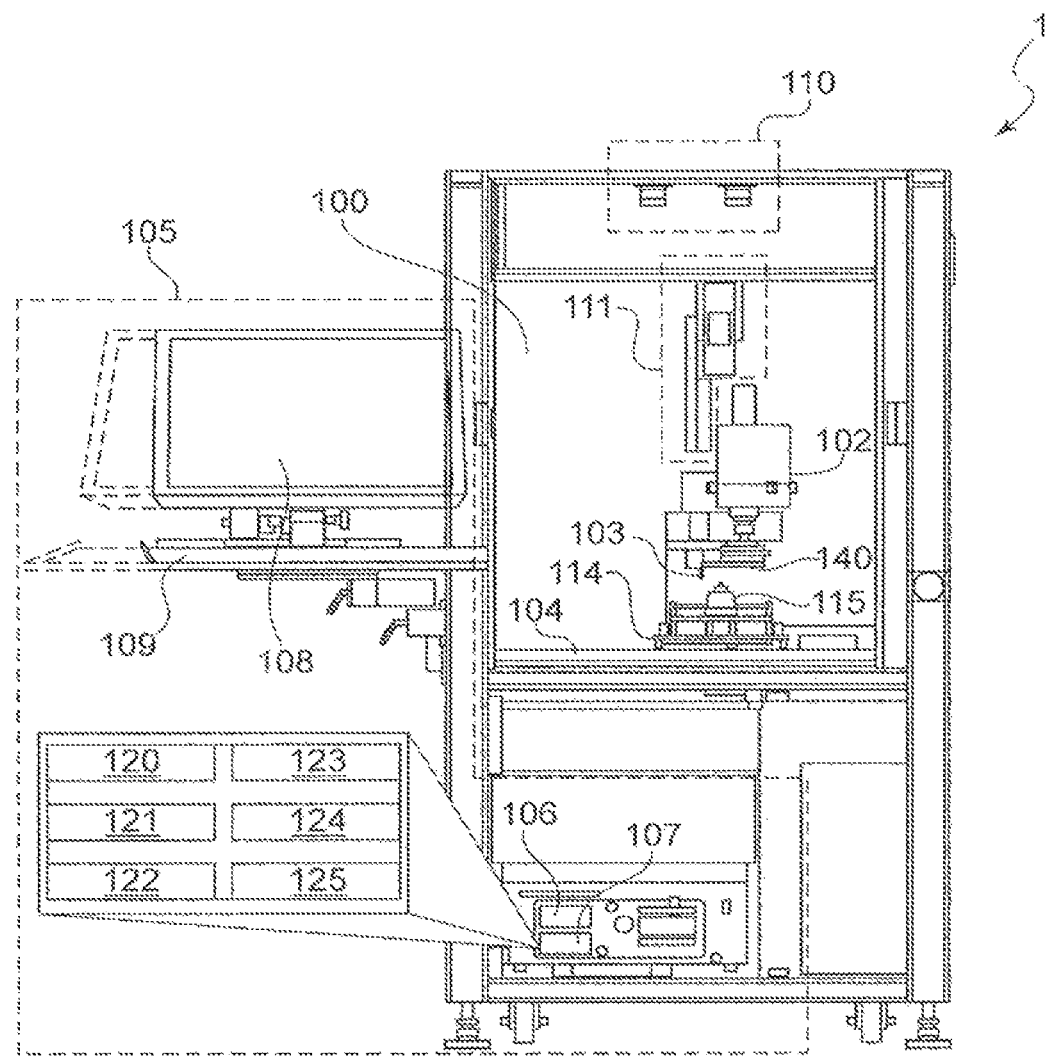
FIG. 1a is a diagram showing components of a system according to an example embodiment of the present invention.

FIG. 1a shows a device testing system 1 according to an example of the present invention. The device testing system 1 may include a compartment 100 which may house a robot 102, a platform 104, a user terminal 105, a light fixture 110, and a camera arrangement 111. The robot 102 may includes an arm 103 to operate a tested device 115. As used herein, the term tested device does not necessarily mean that the device is currently undergoing a test, but rather means that the device is one for which the system 1 is configurable to perform a test. In certain contexts, however, the tested device 115 may be described as undergoing a test.

The compartment 100 may be fully enclosed during configuration of the device testing system 1 and/or testing of the tested device 115 so that lighting may be controlled to be at an optimum level at various stages of the configuration and/or testing.

The platform 104 may include attachment point at which to attach a device fixture 114 upon which the tested device may be fixedly, e.g., via an adhesive, mounted. The platform 104 may, for example, include recesses into which pegs extending from a bottom surface of the device fixture 114 may be inserted for ensuring that the device fixture 114 is placed in the same position with respect to the robot 102 each time the device fixture 114 is placed for testing of the mounted tested device 115.

During configuration and/or testing, the tested device 115 may be positioned with respect to the device testing system such that a plane of the tested device 115 that includes a display screen is perpendicular to a direction in which the arm 103 extends towards the platform 104 to operate the tested device 115. Where a portion of the tested device 115 which include the majority of user operable input devices, e.g., a keypad, is coupled to the portion including the display screen, e.g., in a hinged manner, such that, in an open position of the tested device 115, the keypad portion is arranged at a less or greater than 180° angle relative to the display screen portion, it may be required for the arm 103 to extend to substantially different positions in the direction perpendicular to the plane of the platform 104 to operate different buttons of the tested device 115.

Figure 2:
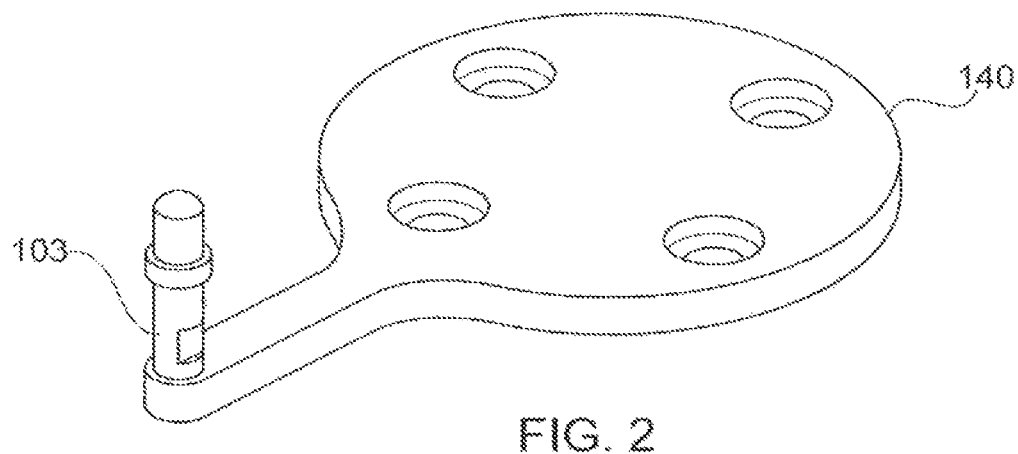
FIG. 2 is a diagram showing a robot arm and plate according to an example embodiment of the present invention.

The arm 103 may be attached to a main body of the robot 102 via an arm plate 140 more clearly shown in FIG. 2, such that the arm 103 is laterally displaced from a vertical axis of the main body of the robot 103. Such displacement may provide for cameras of the camera arrangement 111 a better view of the tested device 115 during configuration and/or testing.

Figure 1B:
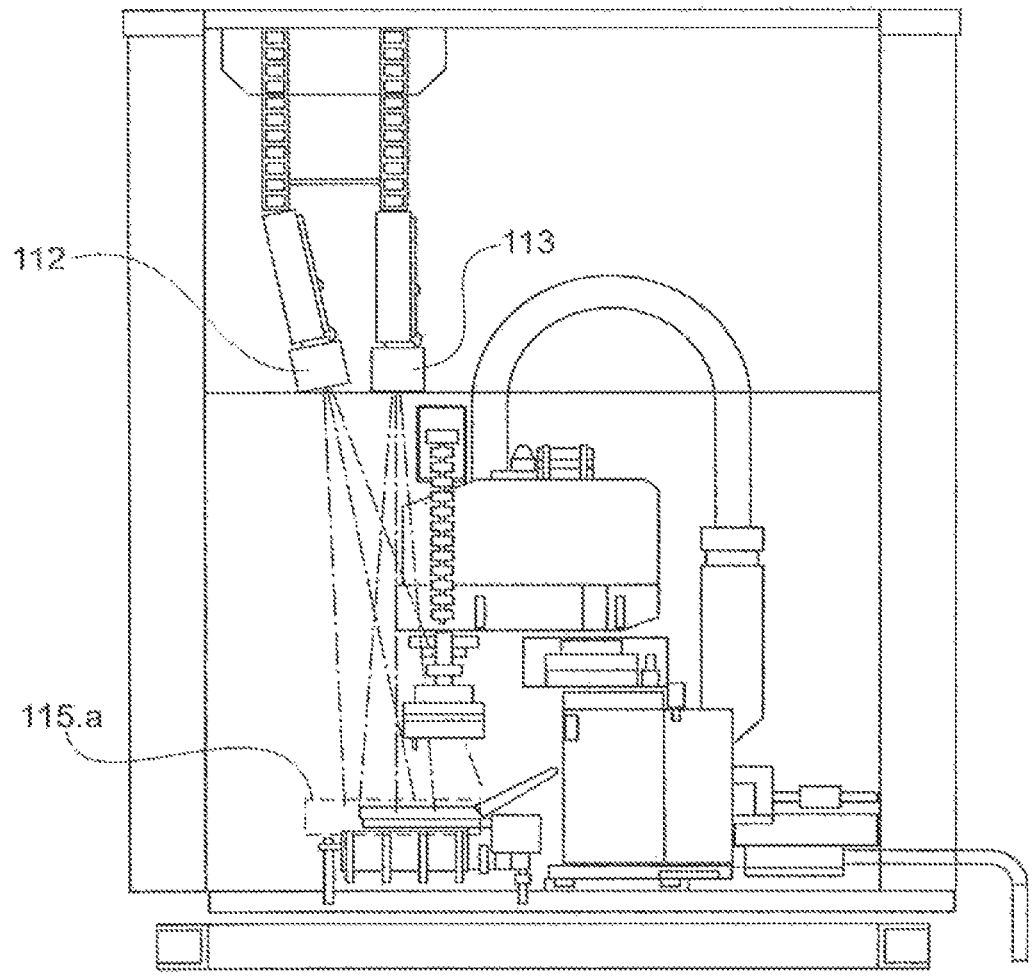
FIG. 1b is a diagram showing components of a system according to an example embodiment of the present invention.

As shown in FIG. 1b, the camera arrangement 111 may include a first camera 113 and a second camera 112. In an example embodiment of the present invention, the second camera 112 is angled such that an axis extending perpendicularly through its lens extends towards the platform 104 at a non-perpendicular angle and whose settings may be such that its field of view encompasses the entire tested device 115. A display screen of the tested device 115 may be laterally shifted from an axis extending perpendicularly through the lens of the second camera 112 towards the platform 104. Further, the portion 115a of the tested device 115 including the display screen may be at an angle relative to the axis extending through the lens of the second camera 112, where the angle is not 90°.

In an example embodiment of the present invention, the first camera 113 is arranged such that its lens is approximately parallel to the platform 104 and therefore approximately parallel to the surface of the display screen of the tested device 115. Further, the camera 113 and the device fixture 114 may be positioned relative to each other such that an axis extending perpendicularly through the lens of the camera 113 extends approximately perpendicularly through the display screen of the tested device 115, e.g., through a center of the display screen. The display screen of the tested device 115 may thus be in better focus and be viewed with greater resolution by the first camera 113 than by the second camera 112, so that, while the second camera 112 may record images, e.g., moving images, of the entire tested device 115, the first camera 113 may record images in which the display screen may be more clearly depicted to allow for processing by image recognition software, including, for example, optical character recognition (OCR), of the image of the display screen. In an example embodiment, the zoom setting of the first camera 113 may be such that the display screen entirely or approximately entirely encompasses the field of view of the first camera 113.

Figure 3:
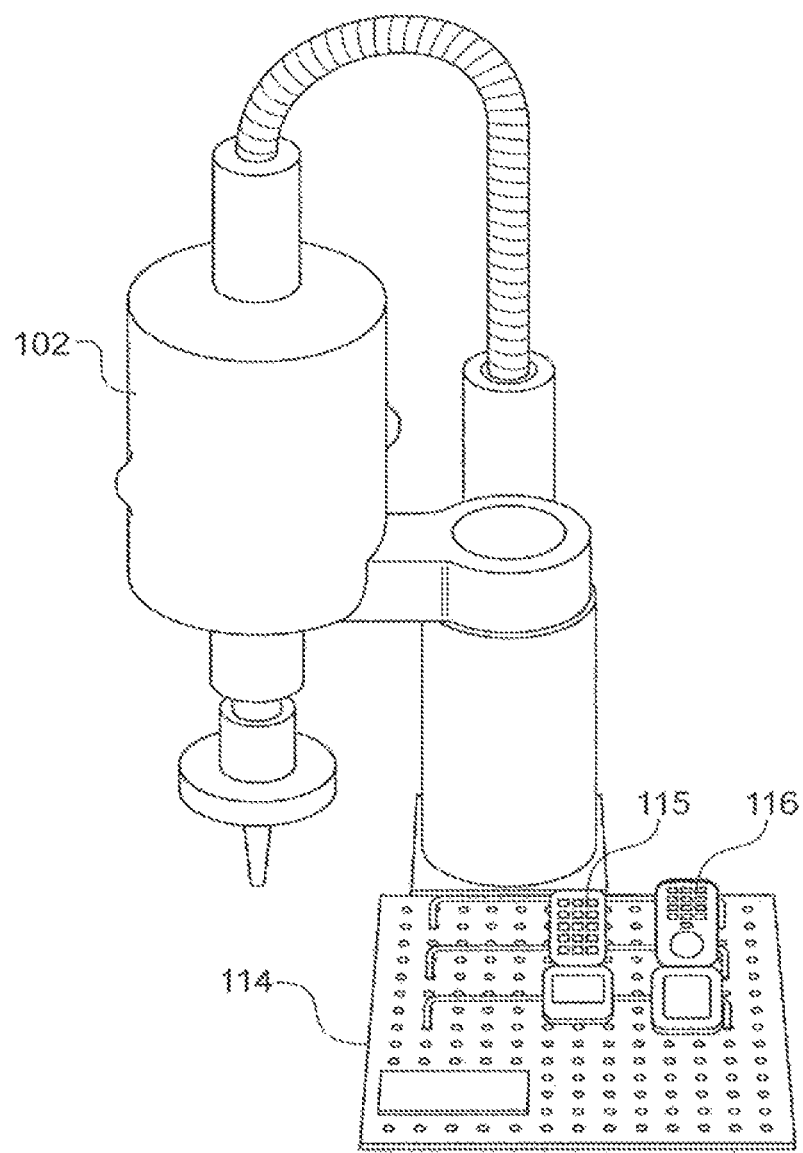
FIGS. 3 and 4 show exemplary embodiments of the present invention in which a tested device and partner device may be placed in close proximity during a test.
Figure 4:
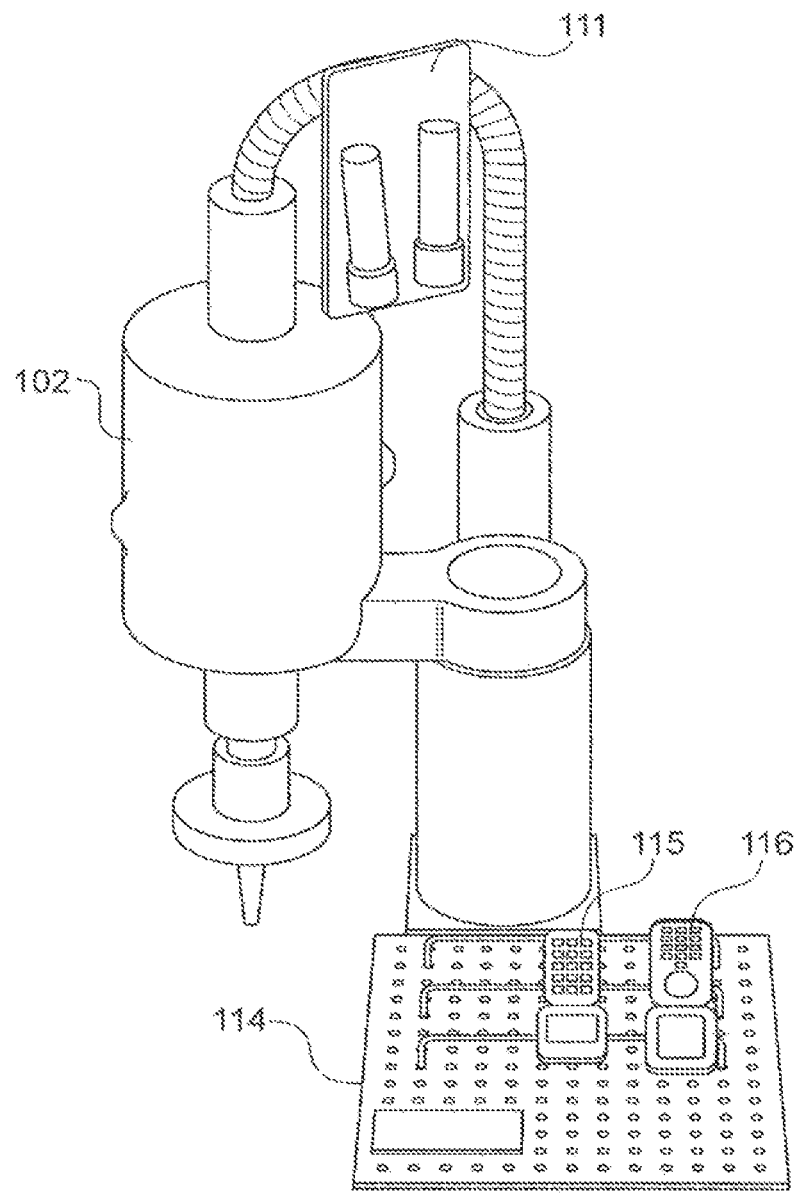

The device fixture 114 may be configured to allow for mounting thereon of the tested device 115 and a partner device 116 (which may itself occupy the role of a tested device and may be tested during a different testing operation of the system 1) in close proximity to the tested device 115 as shown in the two exemplary embodiments of FIGS. 3 and 4. The camera 112 may be arranged and the setting of the camera 112 may be configured such that the tested device 115 and the partner device 116 may be within the field of view of the camera 112, so that the recorded images generated by the camera 112 may be simultaneously of both the tested device 115 and the partner device 116.

The user terminal 105 may include a processor 106, a memory 107, a display 108, and an input device 109. The processor 106 may include any suitable conventional processing circuit implemented in any conventional form, such as a Central Processing Unit (CPU) of a Personal Computer (PC). The memory 107 may include any suitable conventional memory device, such as Random Access Memory (RAM), Read Only Memory (ROM), a hard disk, magnetic tape, a Compact Disk (CD), Flash Memory based device, and/or a Digital Versatile Disk (DVD). The memory 107 may include program instructions executable by the processor 106 to perform the various functions described herein for configuring and operating the system 1 and for operating the partner device 116 in the various exemplary ways described herein.

In an example embodiment of the present invention, the processing circuit may include a robot controller PC and a Test Executive PC (TEPC), where both PCs are connected to an Ethernet switch in the station, and they communicate over a local network. The TEPC sends button push and other commands to the robot controller PC, which has software running on it to listen to and act upon the commands. The display and input device are common to both the TEPC and the robot controller PC, connected by a KVM switch.

The tested device 115 and the partner device 116 may each be a communications device, such as a mobile phone. The processor 106 may be connected to the partner device 116, e.g., via a communications/control interface, for example a serial interface, of the partner device 116. In an example embodiment, the partner device is connected to the TEPC. During testing of the tested device 115, the processor 106, e.g., TEPC, executing partner device instructions 120 in the memory 107, e.g., a portion of the instructions 120 which resides in a part of the memory 107 which the TEPC processor accesses, may input commands to the partner device 116 via the serial interface of the partner device 116. The commands may simulate operation of input hardware of the partner device 116 which causes the partner device 116 to transmit a communication to the tested device 115.

In an example embodiment of the present invention, the processor 106, e.g., TEPC, may also intercept data of the partner device 116 used for generating a display in the display screen of the partner device 116. Where, during testing of the tested device 115, the tested device 115 is operated to transmit a communication to the partner device 116, the processor 106, e.g., TEPC, may analyze the intercepted data from the partner device 116 to determine whether the appropriate result for the expected communication from the tested device 115 was obtained by comparing the intercepted data with expected data stored in the memory 107, e.g., TEPC memory. If the result is not what was expected, the processor 106 may determine that an error has occurred. Similarly, where, during a part of the testing of the tested device 115, the tested device 115 was not to have communicated with the partner device 116, the processor 106, e.g., TEPC, may determine that an error has occurred where non-expected data is intercepted from the partner device 116.

In an example embodiment of the present invention, the processor 106, e.g., TEPC, may be coupled to the cameras 112 and 113. The processor 106, e.g., TEPC, may receive images sensed by a sensor of the camera 113 which captures light passing through the lens of the camera 113. The processor 106, e.g., TEPC, may execute image processing software 121 to compare the images received from camera 113 to images of a display screen image collection 122, e.g., stored in the memory of the TEPC, to determine whether the images received from the camera 113 match the images of the collection 122, e.g., stored in the memory of the TEPC. For each of the images of the collection 122, e.g., stored in the memory of the TEPC, the collection 122 may identify the particular respective operation(s) of the tested device 115 with which the image is associated. For each such identified one or more operations, upon performance by the robot 102 of the identified operation(s), the processor 106, e.g., TEPC, may compare the image captured by the camera 112 immediately following performance of the operations(s) with the image associated with the performed operation(s).

While the camera 113 provides images to the user terminal 105, the camera 112 may also provide images to the user terminal 105. The images provided by the camera 112 may be moving images, i.e., movies. The moving images may be stored in a buffer of the memory 107, e.g., of the TEPC. In response to a determination by the processor 106, e.g., TEPC, that an error has occurred, the processor 106, e.g., TEPC, may transfer a number of the images in the buffer to a permanent memory location, images of which are playable as a movie, e.g., on display 108. In an example embodiment of the present invention, the images which are transferred are those encompassing a time period beginning shortly before the occurrence of the error and ending shortly after the occurrence of the error.

In an example embodiment of the present invention, the buffer may be configured as a First-In-First-Out (FIFO) memory and to hold only a small number of images. Once full, for each newly received image, the image of the FIFO which was received prior to all other images of the FIFO may be deleted and the newly received image may be written into the FIFO. In an example embodiment, all of the images of the FIFO or acquired images in the form of a video may be transferred to permanent storage upon detection of an error. Alternatively the number of images of the temporary memory which are transferred to permanent storage may be based on a predetermined number or a predetermined time interval with which the processor 106, e.g., TEPC, is configured. It is noted that the number of recorded image frames which represent a time interval may vary e.g., if the frame capture rate of the camera 112 varies. Alternatively, all images may be grabbed and saved to a file on the local disk. Upon detection of an error, a number of images may be stored at a separate memory location for viewing of the error. In yet another alternative, all images are stored to a temporary file which is deleted if no error occurs and permanently stored if an error is detected. By the conditioning of permanent storage of images upon error detection as described with respect to these embodiments, the required storage capacity may be reduced because, for example, full length video of every run from start to finish is not stored.

Figure 5:
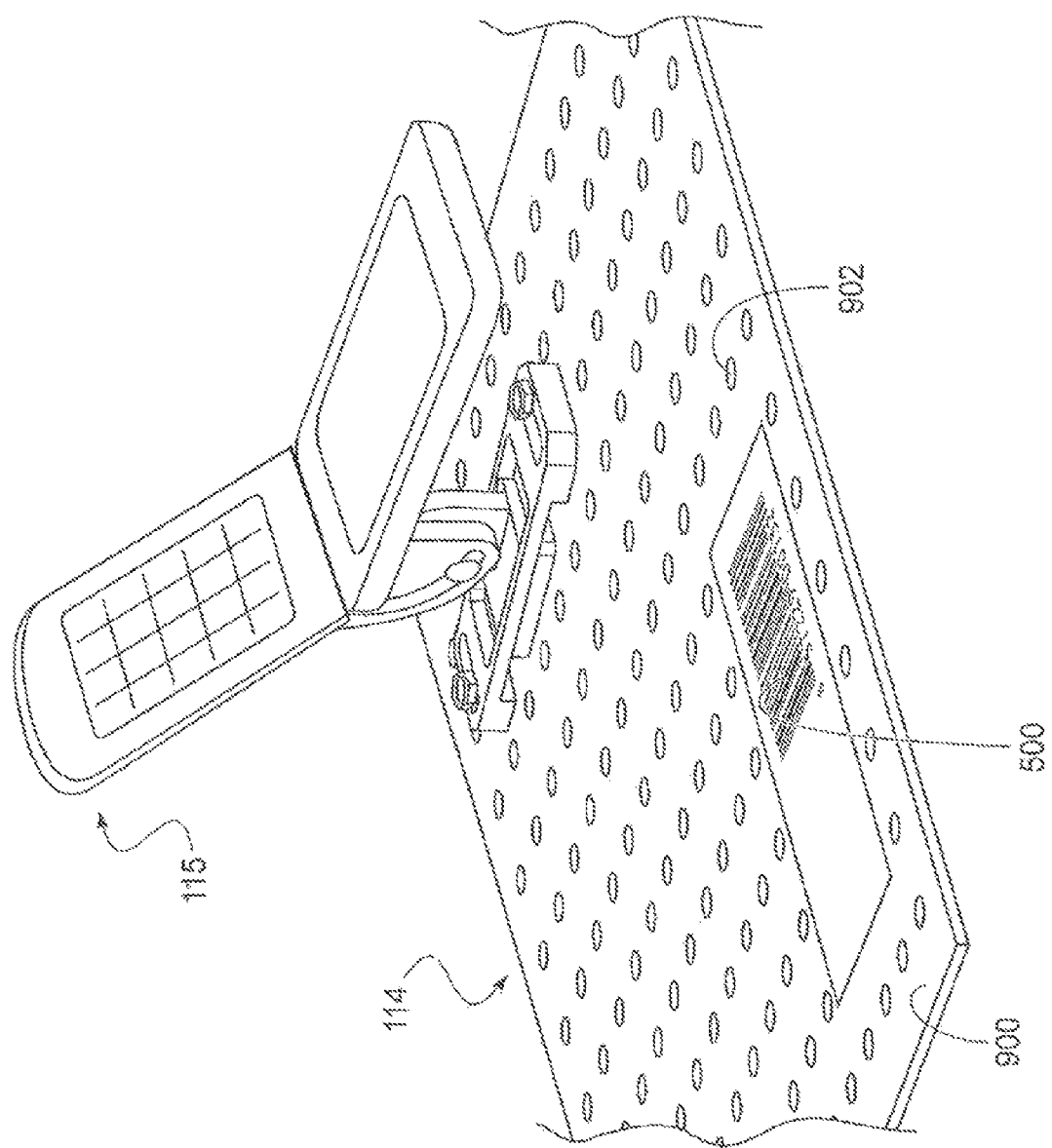
FIG. 5 shows components of a device fixture base plate and a barcode according to exemplary embodiments of the present invention.

In an example embodiment of the present invention, the memory 107, e.g., on the TEPC, may include a configuration file database 123 which includes a respective configuration file or folder for each tested device 115 for which the system 1 is configured. In an example embodiment of the present invention, where some of tested devices 115 are very similar, such that configuration of the system 1, with respect to the operations to be performed during the testing of the devices and the location of the input hardware of manipulated by the robot 102 during the test are identical, those similar tested device 115 may share a same one of the configuration file or folder. In an alternative example embodiment, regardless of similarity of features, no two tested devices, e.g., phones, share the same configuration file, but rather each have a unique configuration file/folder structure. For each different configuration file or folder, a unique code may be generated by the processor 106. Alternatively, a separate PC outside the robot station may generate and/or print the code. The code may be codable, e.g., in a barcode. In an example embodiment of the present invention, a code, e.g., a barcode, may be placed on a tested device 115 or on the device fixture 114. FIG. 5, for example, shows a barcode 500 placed on the device fixture 114 near the tested device 115 with respect to an axis extending perpendicularly through lens of the camera 112 so that the barcode 500 is in the field of view of the camera 112 when the device fixture 114 is mounted on the platform 104 in the testing position.

Upon initialization of the system 1 for performing a test, the processor 106, e.g., TEPC, may operate the camera 112 to obtain an image. The processor 106, e.g., TEPC, executing the image processing software 121, e.g., stored on the TEPC, may detect the barcode 500 in the obtained image, process the barcode 500 to determine its underlying code, compare the underlying code with a set of codes stored in the memory 107, select the configuration file or folder associated with the code, and begin operating the robot 102 according to the configuration parameters included in the configuration file or folder to perform the testing sequences outlined in the configuration file or folder.

If a barcode is not detected, the processor 106, e.g., TEPC, may, according to different exemplary embodiments, cause the display 108 to output an error message, output a message requesting a user to manually input, via the input device 109, the code, or output a message requesting the user to begin a process for generation of a new configuration file or folder. In an example embodiment of the present invention, the processor 106, e.g., TEPC, may cause the display of an error message indicating that no barcode is included (or that an included barcode is not recognized), and requesting input indicating whether a configuration file exists which may be used for the mounted tested device 115. If the user indicates that a configuration file exists, the user may be prompted to enter the code. If the user indicates that a configuration does not yet exist, the user may be prompted to begin the process for generation of the configuration file or folder.

In an alternative example embodiment, the user is prompted for generation of a configuration file or folder only if: (a) no barcode is found; or (b) a barcode is found and no configuration data exists for that phone. The user is not prompted for whether a configuration file exists, as this is determined programmatically.

In an example embodiment of the present invention, the light fixture 110 may include, for example, light emitting diodes (LEDs), e.g., 2 LEDs. In an example embodiment of the present invention (not shown), there are two independently controllable light fixtures, one on each side of the camera, each light fixture including approximately 6 LEDs. The light fixture 110 may be configured to produce a plurality of levels of light. The processor 106, e.g., TEPC, may be coupled directly or indirectly to the light fixture 110 and may be configured to control the light fixture 110 according to a light control program 124, e.g., on the TEPC, to vary the light level produced by the light fixture.

In particular, the light fixture 110 may be configured to produce light at two different light levels. Upon initiating the system 1 to perform a test of the tested device 115, the processor 106, e.g., TEPC, executing a light control program 124 may operate the light fixture 110 to emit light at a first level and may operate the camera 112 to record an image while the light fixture 110 emits light at the first level. The processor 106, e.g., TEPC, may process the image obtained from the camera 112 operated while the light fixture emits light at the first level to recognize the barcode 500 (if any is included).

After obtaining the image and/or recognizing the barcode 500 or otherwise determining the code to be used for obtaining the necessary configuration file or folder, the processor 106, e.g., TEPC, may turn off the light fixture 110 so that it does not emit any light. The processor 106, e.g., executing instructions of a selected configuration file of the database 123, e.g., the TEPC, may further operate the robot 102 while the light fixture 110 is turned off to operate the tested device 115 so that the display screen of the tested device 115 is turned on. The processor 106, e.g., TEPC, may be further configured to execute instructions in the memory 107, e.g., on the TEPC, for detecting the precise position and perimeter of the display screen of the tested device 115 with respect to the camera 113 based on a contrast between the light produced by the display screen and the non-lit surrounding area, which contrast is determined by analysis of an image obtained from the camera 113 while the light fixture 110 is turned off and the display screen is active to produce light. Although the tested device 115 may be fixedly mounted to the device fixture 114 and although the position of the device fixture 114 with respect to the platform 104 may be substantially the same each time the fixture 114 is placed on the platform 104 in position for testing, the display screen finding process may be performed by the processor 106, e.g., TEPC, because a slight shift of the display screen relative to the camera arrangement 111 may nevertheless occur, which may cause a miscalculation of regions of interest (ROIs) used for image processing during the test of the tested device 115. For example, such a shift may be caused by slight differences in the camera alignments on different copies of the test system.

After determining the display screen position relative to the camera 113, the processor 106, e.g., TEPC, may control the light fixture 110 to emit light at a second level different than the first level which was used to read the fixture barcode. The second light level may be maintained for the remainder of the testing process of the tested device 115. In particular the second light level may be lower than the first light level so that the display screen emitted light is more pronounced relative to the light emitted by the light fixture 110 than it would be if the light fixture 110 would emit light at the first light level.

In an example embodiment of the present invention, the compartment 100 may be completely enclosed. At one or more sides, the compartment 100, the enclosure of the compartment may be via an openable door or curtain, so that a user may have access to the interior of the compartment 100. The enclosure of the compartment 100 may allow for precise control of the light level within the compartment without being affected by ambient light from outside the compartment 100.

In an example embodiment of the present invention, the processor 106, e.g., TEPC, may execute a tested device button location training wizard 125 stored in the memory 107, e.g., on the TEPC. For example, a user may input commands via the input device 109 to cause the processor 106, e.g., TEPC, to load and execute the wizard 125. Instructions of the wizard 125 may cause the processor 106 to prompt the user, e.g., via the display 108, for various data or for manually operating the robot arm 103. Responsive to the user input and arm operation, the processor 106 may generate a new configuration file or folder of the database 123 and/or new sub-files or folders thereof. In an example embodiment of the present invention, responsive to the user input and arm operation, no new files or folders are generated, but rather, an existing configuration file is modified to include the trained location of the buttons.

During execution of the wizard 125, the processor 106, e.g., TEPC, may prompt the user to input basic software features supported by the new tested device 115. For example, the prompts may be in the form of a series of "yes and no" questions or checkboxes, each questioning whether the new tested device 115 includes a respective basic feature. A non-exclusive list of exemplary features about which the processor 106 may ask includes the support of various tasks such as handling calls, messaging, and/or e-mailing and the types of input hardware included in the tested device 115, e.g., a camera, and/or the surfaces of the tested device 115 on which the respective input hardware is positioned. The processor 106 may then determine whether the database 123 includes a configuration file or folder for another device having features similar to those input for the new tested device 115. For example, if a majority of the features input for the new tested device 115 match the feature input provided upon configuring the system 1 for another device, the processor 106 may determine that the two devices are similar. Further, if more than one other device is determined by the processor 106 to be similar to the new tested device 115, the processor 106 may select the device that is most similar, as determined by the input, to the new tested device 115.

In an alternative example embodiment, the program does not determine whether two devices are similar. Instead, a user makes this determination and chooses a phone of similar features, if any, as a baseline for modification.

In an example embodiment of the present invention, the processor 106, e.g., TEPC, may initially ask the user to identify a device for which the system 1 has been previously configured and which the user believes is most similar to the new tested device 115. If the user identifies such a device and the processor 106 finds a configuration file or folder in the database 123 which is associated with the identified device, the processor 106 may omit the steps of requesting the user to input the basic features of the new tested device 115. In an alternative example embodiment, there is no omission of steps. All configuration steps are run through, but less work is required where only modification of a baseline file can be performed instead of generation of configuration file features from scratch.

Figure 11:
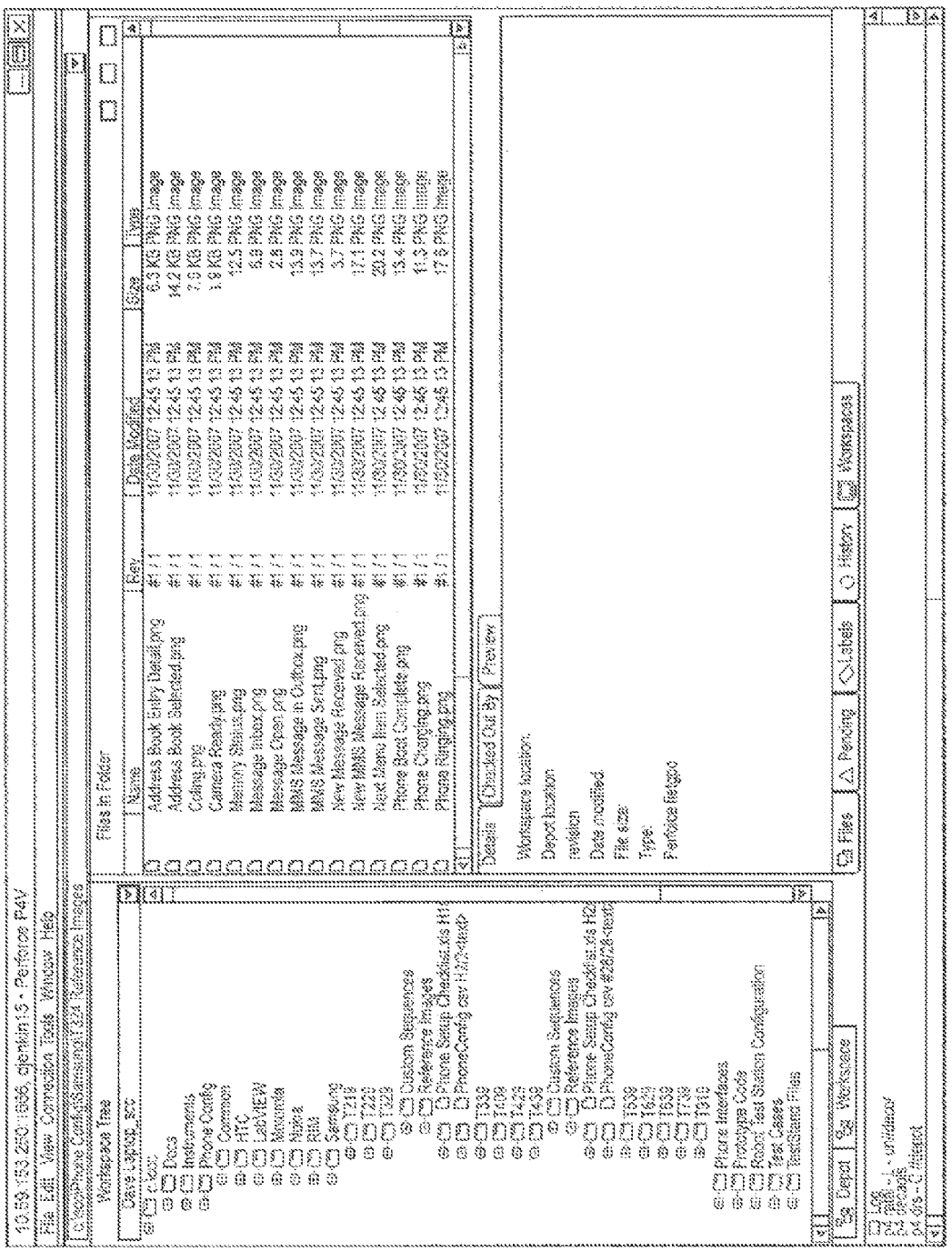
FIG. 11 is a screenshot showing an exemplary file structure for configuration files, according to an example embodiment of the present invention.

If the processor 106 determines that a device associated with a configuration file or folder of the database 123 is similar to the new tested device 115 or if the user identifies such a similar device, the processor 106 may obtain the associated configuration file or folder from the database 123 or other device or phone configuration directory and generate a copy of the obtained file or folder as a new configuration file or folder to be stored in the database 123 or other device or phone configuration directory and to be associated with the new tested device 115. The folders may be named according the make and model of the devices being tested. For example, a folder may be named by manufacturer, which may include sub-folders, each of which is associated with a respective tested device and is named by the respective make of the tested device. The make folder may include sub-folders for button sequences to be used and for display screen images. The files may correspond to the different sequences and the different display screen images. An example file structure is shown in FIG. 11.

The wizard may automatically populate a configuration file identifying the supported features of the tested device 115, including the supported actions and the included hardware, such as general placement of buttons and inclusion of a camera. This file may be used to determine which test cases to run for testing the features of the tested device 115.

However, because the configuration file or folder was initially generated for a different device, not all of the settings accurately reflect the new tested device 115. Therefore, the wizard may step through a series of display screens with which the user may interact for inputting information regarding the new tested device 115 for its operability during a test. The display screens may be initially populated with information reflective of the different device for which the configuration file or folder was generated. Wherever the user notices a discrepancy between the displayed data and that which would accurately reflect the new tested device 115, the user may input the necessary changes. For example, the user may update a button sequence to be used for the tested device 115 to accomplish a particular task and/or may update the display screen image that is displayed on the display screen of the tested device 115 at or following a particular event.

Further, if the new tested device 115 includes an added feature for which the device for which the previous configuration file does not provide an equivalent, a new sub-file or sub-element for the added feature may be added to the configuration file. Similarly, the processor 106, e.g., TEPC, may remove sub-files or sub-elements corresponding to features for which the new tested device 115 does not provide an equivalent.

If the user does not identify a similar device and the processor 106, e.g., TEPC, determines that none of the stored configuration files or folders (if any) of the database 123 are associated with a device similar to the new tested device, a new configuration file or folder may be generated from scratch, requiring the user to input all of the necessary information. In an alternative example embodiment, the user is always forced to select an existing phone/device, so that the wizard automatically generates a configuration file for the new device based on the file of the selected device. For example, an initial configuration file may be stored when programming the wizard for later generation of files for devices to be tested.

After customizing the configuration file with respect to the supported features of the tested device 115, the wizard may step through a plurality of test cases for which the wizard has been previously configured. During the step through of the test cases, for each case, the wizard may prompt the user to operate the new tested device 115, while it is mounted so that the display screen of the device 115 is in the field of view of the camera 113, so that the display screen of the new tested device 115 displays a screen that is to result from the respective test case. Once the resulting screen is displayed, the user may input an indication that the screen is displayed. The processor 106, e.g., TEPC, may record in the configuration file and in association with the respective test case an image obtained from the camera 113 which was recorded by the camera 113 when the user input the indication that the requested screen was displayed. The processor 106 may compare images obtained from the camera 113 during a test of the tested device 115 to the images of the configuration file associated with the tested device 115.

In an example embodiment of the present invention, the processor 106, e.g., TEPC, may initially populate the configuration file with those of a device identified by the user or the processor 106 as similar to the new tested device 115 (if any), as described above. The user may indicate for each test case whether a different display is to be provided. In an alternative example embodiment of the present invention, new display screens for each new tested device 115 may always be required to ensure that the processor 106, e.g., TEPC, accounts for slight spatial variations in the display screens.

Figure 6:
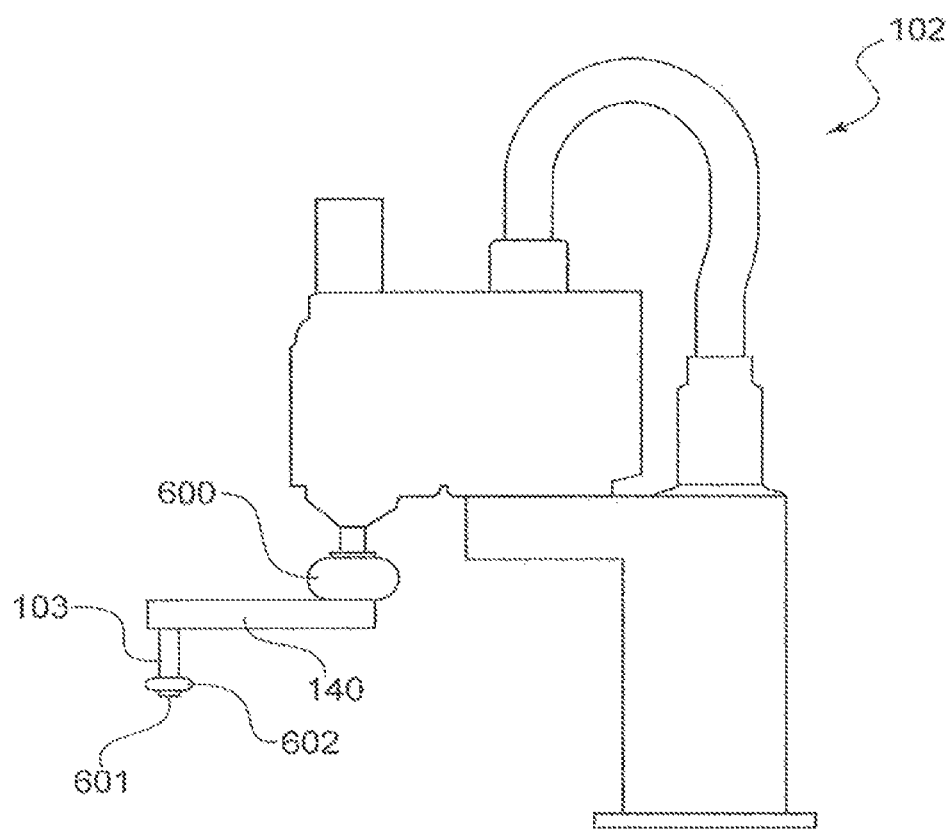
FIG. 6 shows components of a robot according to an example embodiment of the present invention.

In an example embodiment of the present invention, the robot 102 may include a force sensor 600 as shown in FIG. 6. The force sensor 600 may sense the force exerted by the arm 103 in a direction perpendicular to the platform 104 and in a direction parallel to the platform 104. It is noted that the arm 103 may operate input hardware of the tested device 115 by depressing a button on a face of the tested device 115 which is parallel to the platform 104 and may operate input hardware of the tested device 115 by depressing a button on a face of the tested device 115 which is perpendicular to the platform 104. In the former scenario, detected force in the perpendicular direction would increase as the button is depressed, whereas in the latter scenario detected force in the parallel direction would increase as the button is depressed. Different parts of the arm 103 may be used for depressing buttons depending on the direction in which the buttons are depressed. For example, an arm end 601 may be used to depress a button in the perpendicular direction and a side element 602, e.g., formed by a ring, may be used to depress a button in the parallel direction.

In an example embodiment of the present invention, during the generation of the configuration file for the tested device 115, the processor 106, e.g., TEPC, may record coordinates of each input hardware to be operated by the system 1 during a test of the tested device 115. Based on information included in the configuration file indicating the input hardware included in the new tested device 115, which information is provided as described in detail above, the wizard 125 may, for each hardware input device, e.g., button, cause the processor 106, e.g., TEPC, to prompt the user to manually move the robot arm 103 to a position which matches the position of the button but on a different plane than that in which the button is located. For example, for buttons on the face of the tested device 115 which is parallel to the platform 104, the user would move the arm 103 so that the arm end 601 is lined up with the button but is in a plane parallel to but different than the face of the tested device 125 in which the button is located. For buttons on a face of the tested device 115 which is perpendicular to the platform 104, the user would move the arm 103 so that the side element 602 is lined up with the button but is in a plane parallel to but different than the face of the tested device 125 in which the button is located.

For a button on the face of the tested device 115 which is parallel to the platform 104, once the user inputs an indication that the robot arm 103 has been moved to the requested location, the processor 106, e.g., TEPC, may record in the configuration file the x and y coordinates of the arm end 601, where the x coordinate is a position along an axis that extends along the plane of the platform 104 in a horizontal direction and the y coordinate is a position along an axis that extends along the plane of the platform 104 in the vertical direction. The processor 106, TEPC, may also operate the arm 103 to extend in the perpendicular direction to depress the button. Once the force sensor 600, which may provide its readings to the processor 106, e.g., the robot controller PC, detects that a predetermined force has been reached, the processor 106, e.g., TEPC, may record in the configuration file in association with the button a present z coordinate of the arm 103, where the z coordinate is a position along a plane that extends perpendicular to the platform 104. For most buttons, the force to be used as the predetermined force has been determined to be approximately 500 grams. However, different predetermined forces may be used for different buttons.

In an alternative example embodiment, once the user inputs an indication that the robot arm 103 has been moved to the requested location, the processor 106, e.g., TEPC, initially records in the configuration file the x and y coordinates, as well as initial z coordinate. After the force calibration, the z coordinate is updated.

For a button on the side of the tested device 115 which is perpendicular to the platform 104, once the user inputs an indication that the robot arm 103 has been moved to the requested location, the processor 106, e.g., TEPC, may record in the configuration file the z and y coordinates (and, in an example embodiment, an initial x coordinate) of the arm end 601. The processor 106, e.g., TEPC, may also operate the arm 103 extend in the one of the parallel directions (depending on which side of the tested device 115 the button is located) to depress the button. Once the force sensor 600 detects that a predetermined force has been reached, the processor 106 may record in the configuration file in association with the button a present, e.g., modified, x coordinate of the arm 103. During subsequent testing of the tested device 115, the processor 106, e.g., TEPC, in accordance with the associated configuration file, may cause the robot arm 103 to move to the recorded x,y,z coordinates to depress the respective button of the tested device 115.

During configuration of the system 1 for a new tested device 115, e.g., during generation or modification of a configuration file for the tested device 115, the processor 106, e.g., TEPC, may operate the light fixture 110 similar to the manner described above with respect to is operation during testing of the tested device 115. For example, a barcode may be place on the device fixture 114 prior to configuration of the system 1 for the new tested device 1. When the configuration is initiated, the processor 106 may operate the light fixture 110 to emit light at the first level in order for the processor 106 to detect the barcode 500. Once detected, the processor 106, e.g., TEPC, may turn off the light fixture 110 and prompt the user to activate the display screen of the new tested device 115. Once the processor 106 receives an indication that that display screen is active, the processor 106 may determine the precise position of the display screen relative to the camera 113 by the contrast of the light of the display screen to the unlit surrounding area. Subsequent to recording the display screen position, the processor 106, e.g., TEPC, may operate the light fixture 110 to emit light at the second level. The processor 106 may record the template display screens, as described in detail above, while the light fixture 110 emits light at the second lighting level.

It is noted that the configuration of the system 1 for a new tested device 115 may be interrupted, saved in an unfinished configuration file, and resumed at a later time. Each time, the configuration is resumed, the processor 106, e.g., TEPC, may re-perform one or more of the lighting control steps. For example, each time, the processor 106, e.g., TEPC, may operate the light fixture 110 to emit light at the first lighting level in order to read the barcode and determine which configuration file to open up for modification. The other light control steps may be performed if not all of the display screen templates have yet been performed. In an example embodiment of the present invention, the first light control step may be omitted, where the user martially inputs the code, so that a barcode need not be read. In an example embodiment, the system always attempts to read a barcode and, where the reading is unsuccessful, prompts the user to configure a new device, e.g., phone.

Figure 10:
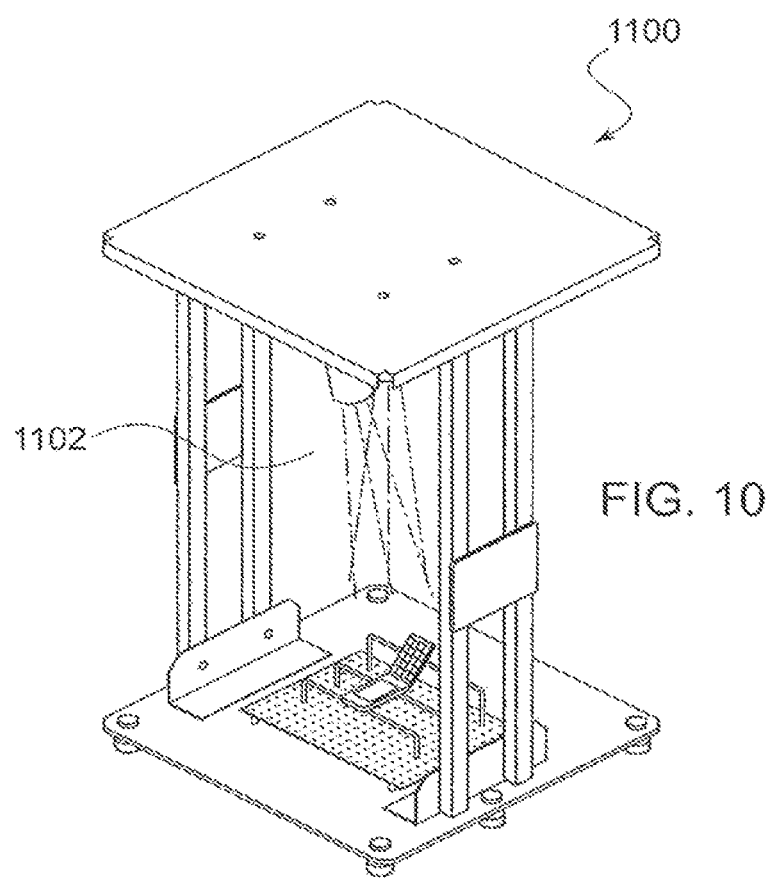
FIG. 10 is a diagram that illustrates a mini workstation according to an example embodiment of the present invention.

In an example embodiment of the present invention, the system 1 may include a mini workstation 100, e.g., as shown in FIG. 10, for performing a significant portion of the configuration of the system 1 for a new tested device 115. For example, the mini workstation 100 may be used to perform all of the configuration, except for the recordation of input hardware coordinates. Many of the components of the main workstation in which testing and configuration of the input hardware coordinates is performed may be omitted in the mini workstation 100. For example, one or more or all of the robot 102, the partner device instructions 120, parts of the configuration wizard 125 that are used for inputting input hardware coordinates, and most of the image processing software (but for, e.g., that used for recognizing the barcode 500) may be omitted in the mini workstation 100. In an example embodiment, much of the software of the main workstation may be included in the mini workstation 100 as a large portion of the same software may be required for acquiring template images at the mini workstation 100. Portions of the configuration file associated with the new tested device 115, e.g., any portion besides for input of input hardware coordinates, may be generated and modified at the mini workstation 100. The mini workstation may include a light fixture 110 and a camera arrangement 111 as described above with respect to the main workstation, each of which may be operated as described above with respect to the main workstation. Although not shown in FIG. 10, the mini workstation may include or be connectable to a user terminal including a processor, input device, and output device, for a user to control the processor to operate the device and to generate and/or modify a configuration file. Further, while not shown in FIG. 10, the compartment 1102 of the mini workstation 100 in which the tested device 115 may be placed for configuration of the system 1 may include walls, doors, and/or curtains, for enclosing the compartment 1102 for increased control of lighting conditions within the compartment 1102.

The mini workstation 100 provides the flexibility of allowing many users to collaborate by performing different parts of the configuration, e.g., simultaneously and/or at many locations.

At any time, configuration may be halted and subsequently resumed at the mini workstation 100 or at the main workstation. The tested device 115, mounted on the device fixture 114, may be transferred to the main workstation for running an actual test on the tested device 115 or for modifying the configuration file to include the data specifying input hardware coordinates. A user has the option of using only the main workstation for all of the configuration and testing.

In an example embodiment of the present invention, different test sequences may be used for different test device 115. The configuration file associated with a tested device 115 may identify the test sequences to be applied to the respective tested device 115 when testing the tested device 115. The processor 106, e.g., a combination of the TEPC and the robot controller PC, may operate the robot 102 during a test according to the test sequences of the associated configuration file. The processor 106 may also interface with the partner device 116 in accordance with the test sequences included in the configuration file in order to control the partner device 116 to communicate with the tested device 115.

In an alternative example embodiment, the test sequences are not located in the configuration file or in the phone configuration directory, but are instead designed to be generic to be applied to all devices. The configuration, reference image, and custom button sequence files in the Phone Config directory are referenced in the test sequences to accomplish this by isolating the devices' operating uniqueness from the generic test sequences. Since the partner device 116 is a constant, files governing its control are stored outside of the Phone Config directory.

Figure 12:
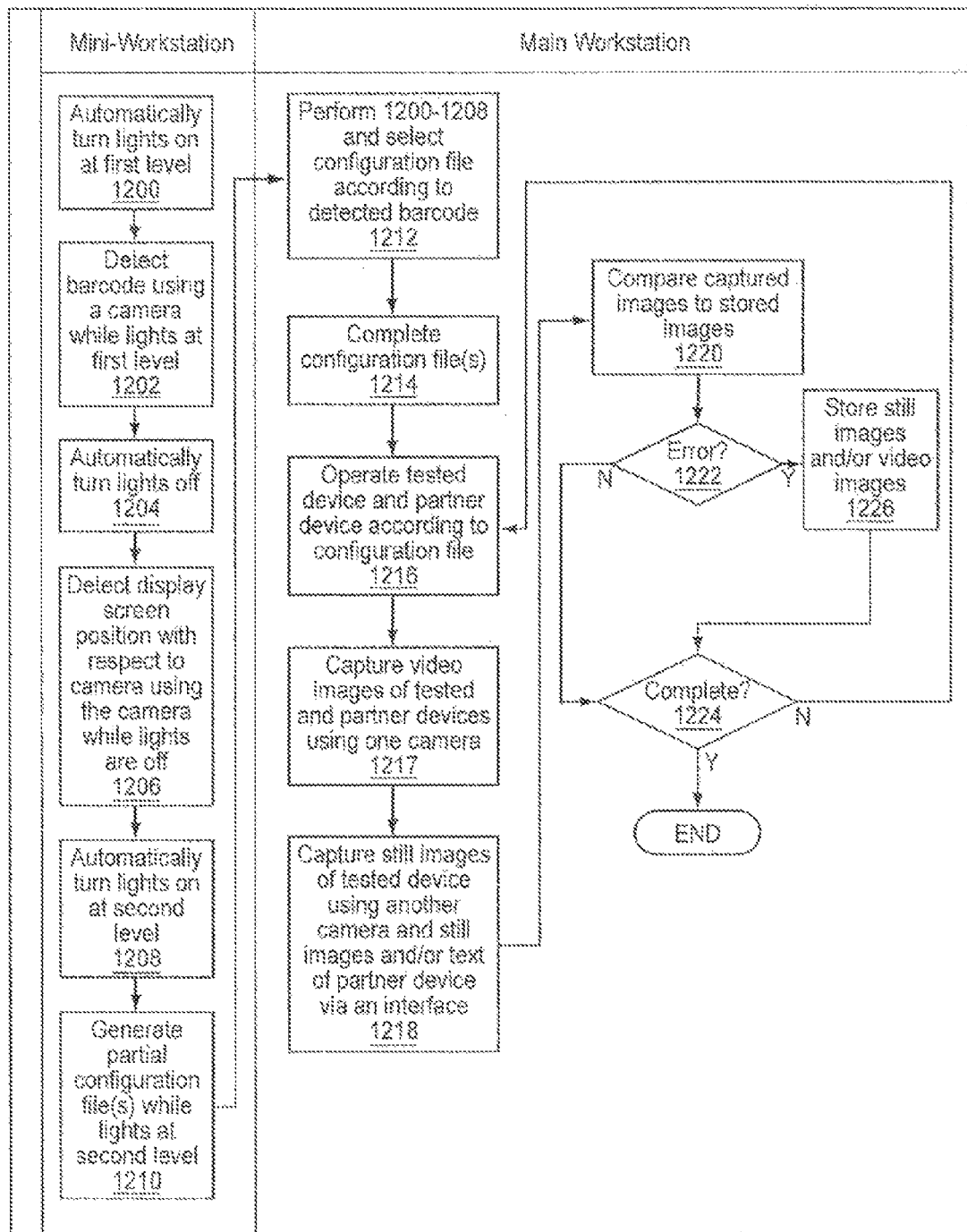
FIG. 12 is a cross-functional flowchart that illustrates a method according to which a device may be tested, including generation of a configuration file and performance of the test, according to an example embodiment of the present invention.
Figure 13:
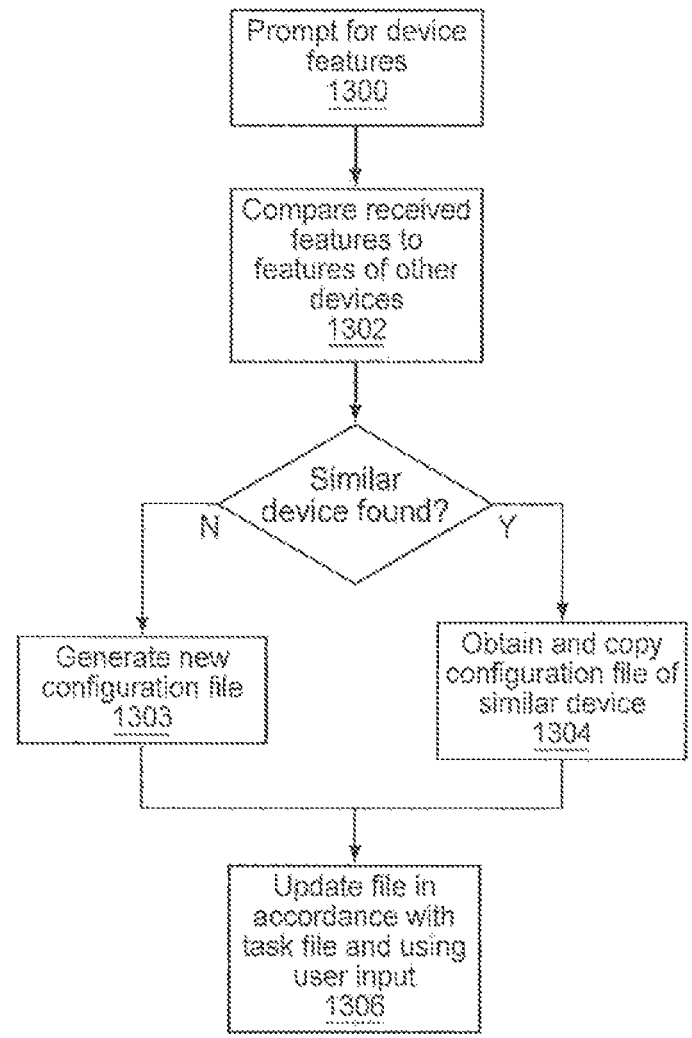
FIG. 13 is a flowchart that illustrates a method of generating a partial configuration file, e.g., at a mini workstation according to an example embodiment of the present invention.

FIG. 12 illustrates a process according to which a device may be tested, including generation of a configuration file and performance of the test, according to an example embodiment of the present invention. At step 1200, a processor of a mini workstation may automatically turn lights on at a first level. At step 1202, a barcode may be detected using a camera of the mini workstation while the lights are at the first level. At 1204, the processor may automatically turn off the lights. While the lights are turned off, the processor may, at 1206, detect a position of the display screen of the tested device with respect to the camera. At 1208, the processor may automatically turn the lights on at a second level. At 1210, the processor may generate part of a configuration file to be associated with the detected barcode. Exemplary details of the generation of the configuration file are illustrated in FIG. 13.

Figure 14:
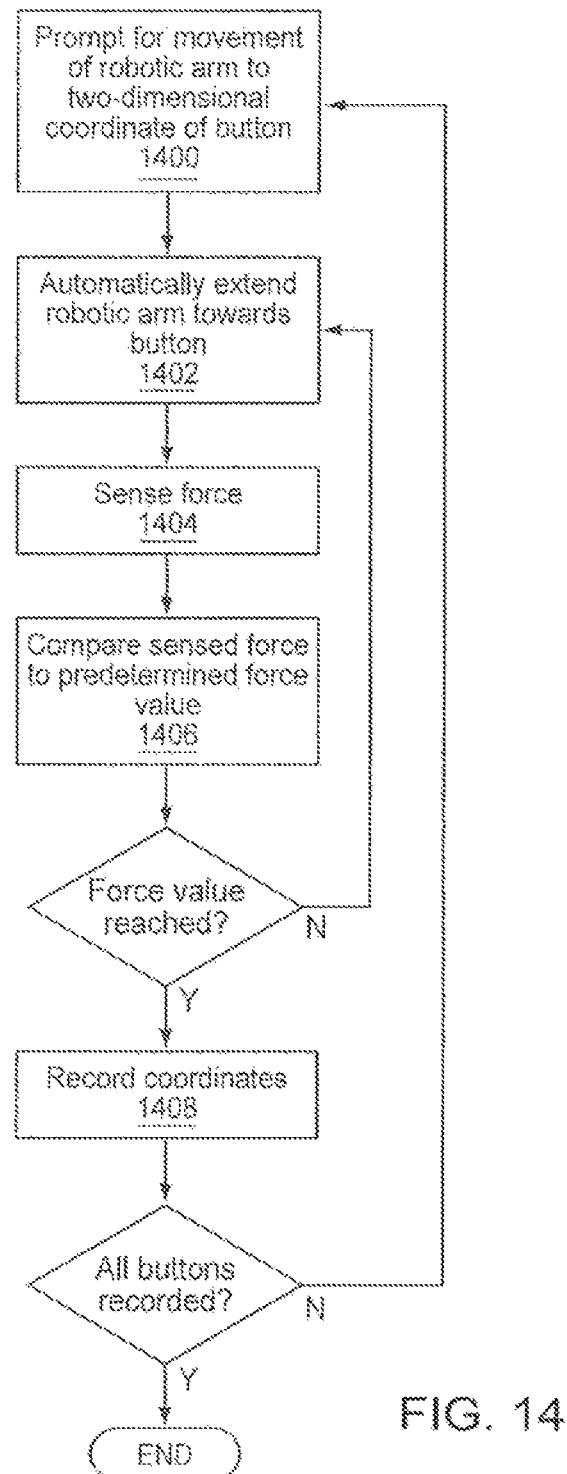
FIG. 14 is a flowchart that illustrates a method of completing a configuration file, according to an example embodiment of the present invention.

At 1212, steps 1200-1208 may be repeated at the main workstation. In accordance with the detection of the barcode (1202) at the main workstation, the configuration file associated with the barcode may be selected. At 1214, the configuration file may be completed. FIG. 14 illustrates exemplary details of the completion of the configuration file.

At 1216, the tested device and a partner device may be operated according to the configuration file and according to stored test sequences. For example, the tested device may be operated using a robotic arm, while the partner device may be operated via an interface to the partner device. If the operation of the devices for the test is separated from the completion of the generation of the configuration file, e.g., by the powering down of the main workstation or the use of the main workstation for configuring or testing another device, steps 1200-1208 may be repeated prior, e.g., immediately prior, to 1216.

At 1217, video images of the tested and partner devices may be captured using one camera. At 1218, still images of the tested device may be obtained using another camera and still images and/or text on the display of the partner device may be obtained via the interface to the partner device. At 1220, the processor may compare the captured still images to stored images. At 1222, whether an error has occurred may be determined based on the comparison. If an error has occurred, the processor may, at 1226, store the captured still images and/or the video images in permanent storage. If an error has not occurred or subsequent to 1226, if the test sequences have not yet been completed (N branch of 1224), the process may continue from 1216. Otherwise, the process may end.

FIG. 13 shows some details of step 1210 according to an example embodiment of the present invention. At 1300, the processor may output prompts for input of device features. At 1302, the processor may compare features input in response to the prompts to those of other devices included in other configuration files associated with those other devices. If a device is determined to be similar based on the comparison, the processor may, at 1304, obtain the configuration files associated with the similar device and copy it as a new configuration file associated with the tested device. If a similar device is not found, the processor may, at 1303, generate a new configuration file. Subsequently, the processor may, at 1306, update the configuration file associated with the tested device responsive to user input and in accordance with a task file which indicates tasks to be performed during a test, as described in detail above. In an example embodiment, 1306 may include a repeat performance of 1300 to step through each of the device features for further customization.

In an alternative example embodiment, the process begins at 1302 with a user manually comparing features of a device to be tested with features of other devices. At 1304, the user selects a comparison device and the processor obtains and copies a configuration file of that device. The process then proceeds from 1304 to 1300 at which the processor may prompt for input of device features to modify the copied configuration file to customize it for the new device at 1306. This alternative embodiment may also omit the decision and step 1303, as the system may always require selection of an already stored configuration file when using the set-up wizard. Thus, according to this alternative embodiment, the sequence of the method is 1302 to 1304 to 1300 to 1306.

FIG. 14 shows some details of step 1214 according to an example embodiment of the present invention. At 1400, the processor may output a prompt instructing to move the robotic arm so that it is positioned at a two-dimensional coordinate of a plane parallel to a plane in which a button is located, where the two-dimensional coordinate corresponds to the two-dimensional coordinate of the button in its plane. Once at the location, the processor may, at 1402, cause the robotic arm to extend towards the button. At 1404, a force sensor may sense force at the tip of the robotic arm and provide the reading to the processor, e.g., robot controller PC. At 1406, the processor, e.g., robot controller PC may compare the sensed force to a predetermined force value. If the force value has not yet been reached, the process may continue again from 1402. Otherwise, the processor may, at 1408, record the three-dimensional coordinate of the robotic arm for the button. The process may be repeated for all buttons. Once the coordinates have been recorded for all of the buttons, the process may end.

In an example embodiment of the present invention, the steps of FIG. 14 are divided into two separate loops. In a first loop, step 1400 is performed for all buttons. At 1400, once the arm is at the instructed location, the processor records a two-dimensional coordinate of the button. In an alternative example embodiment, the processor may initially record an initial three-dimensional coordinate of the button, which is then modified at step 1408. In a subsequent loop, steps 1402-1408 are performed for all of the buttons.

An example embodiment of the present invention is directed to a processor, which may be implemented using any conventional processing circuit, to execute code provided, e.g., on a hardware-implemented computer-readable medium, to perform any one of the processing, alone or in combination, features described above, including control of other hardware components.

An example embodiment of the present invention is directed to a hardware-implemented computer-readable medium having stored thereon instructions executable by a processor to perform any one of the processing, alone or in combination, features described above, including control of other hardware components.

An example embodiment of the present invention is directed to a method which includes the step of transmitting instructions executable by a processor to perform any one of the processing, alone or in combination, features described above, including control of other hardware components.

Figure 7:
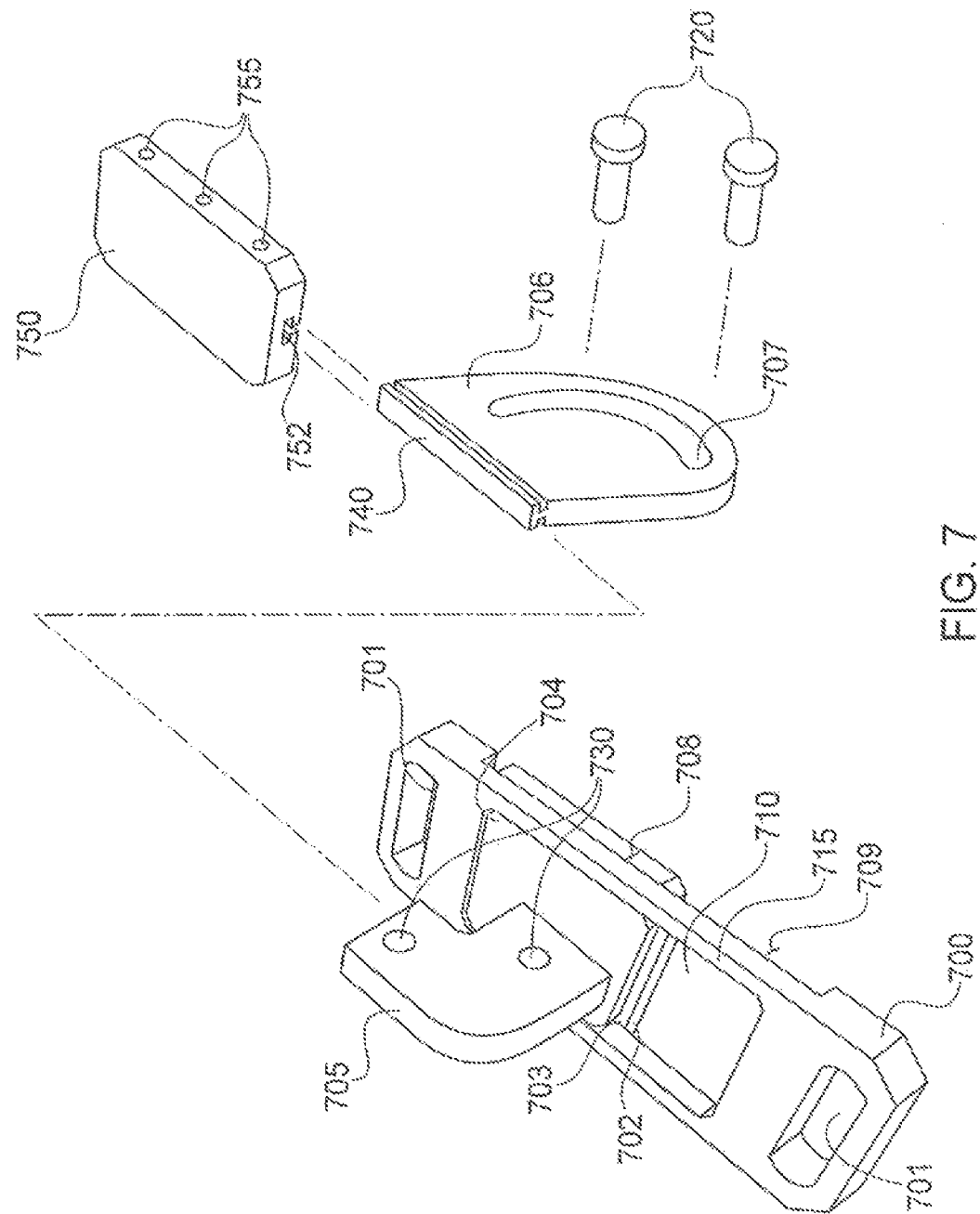
FIG. 7 shows components of a disassembled device fixture according to an example embodiment of the present invention.
Figure 8:
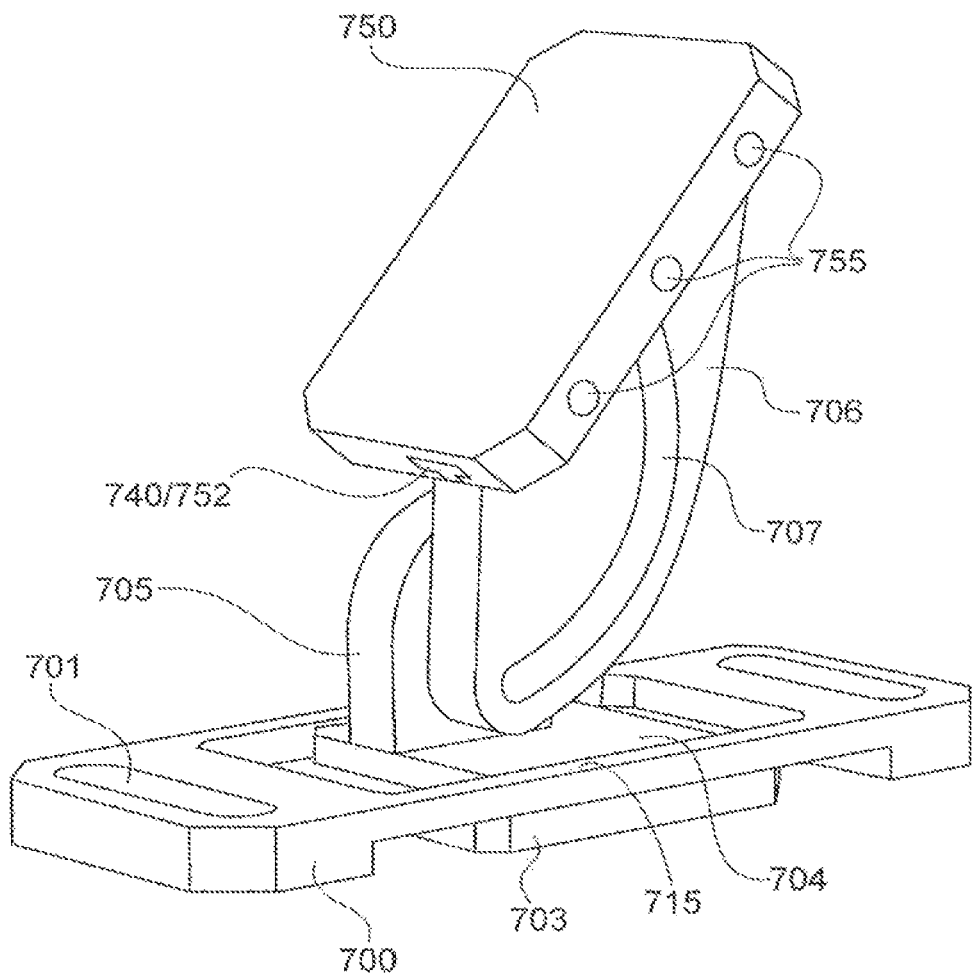
FIG. 8 shows the device fixture of FIG. 7 in its assembled state, according to an example embodiment of the present invention.

In an example embodiment of the present invention, a device fixture 114 may be provided such that it has a small footprint in order to allow for placement of the tested device 115 and the partner device 116 in close proximity. The device fixture 114 may also be constructed in a manner that allows for quick, easy, and convenient adjustment of the position of the tested device 115 with respect to the robot 102 and/or camera arrangement 111. In particular, as noted above, it advantageous to arrange the tested device 115 such that the display screen of the tested device 115 is substantially parallel to the platform 104 and in good view and focus of the camera 113. Further, the device fixture 114 may be such that it may accommodate many different types of tested devices 115 having different structures, without requiring difficult customization. FIG. 7 shows the components of an exemplary device fixture 114, other than a base plate to which the illustrated components may be attached, which may provide all of these described advantages. FIG. 8 shows the exemplary device fixture 114, other than the base plate, in its assembled state.

The device fixture 114 may include an attachment plate 700, a base 702 which may include a wide base 703 and a narrow base 704, a first vertical plate 705, a second vertical plate 706, and a mounting plate 750. The device fixture of FIGS. 7 and 9 may be fixed to a base plate 900 shown in FIG. 5.

The attachment plate 700 may have a respective elongated bore 701 running though each of two sides. Screws 720 may be extended through the elongated bores 701 into threaded bores 902 of the base plate 900 for threaded coupling thereto in order to secure the components illustrated in FIGS. 7 and 8 to the base plate 900. Because of the perpendicular extension of the length of the screws 720 through the elongated bores 701, the attachment plate 700 may be shifted with respect to the base plate 900 by a distance equal to a length of the elongated bores 701 minus the thickness of the screws 720, at least until the screws are substantially tightened in the bores 902.

The attachment plate 700 may also include a window 710 formed in a substantial portion of the attachment plate 700 between the elongated bores 701. The base 702 may slide within the window 710 in a direction perpendicular to the direction in which the attachment plate 700 may be shifted with respect to the base plate 900 after the coupling of the screws 720 extending through the elongated bores 701 to the bores 902, at least until substantial tightening of the screws 720 in the bores 902. Withdrawal of the base 702 from the attachment plate 700 via the window 710 may be prevented by contact of the wide base 703 with a lip 715 of the attachment plate 700. A thickness 708 of the wide base 703 may be greater than a height 709 of the lip 715 from the bottom of the attachment plate 700 in which the wide base 703 may slide. Accordingly, once the screws 720 are sufficiently tightened in the bores 902, the compressive force of the attachment plate 700 upon the wide base 703, due to the disparity between the thickness 708 of the wide base 703 and the height 709, may prevent the base 702 from sliding with respect to the attachment plate 700. Alternatively, the thickness 708 and height 709 may be equal, and tightening of the screws may generate a frictional force which prevents the sliding of the base 702 with respect to the attachment plate 700.

The first vertical plate 705 may include a number of bores 730. e.g., two bores 730, which may extend through the first vertical plate 705 in a direction perpendicular to the direction in which the base 702 slides relative to the attachment plate 700. The second vertical plate 706 may include a curved bore 707 therethrough. Screws may be extended through the curved bore 707 and into the bores 730 for threaded coupling thereto, in order to couple the second vertical plate 706 to the first vertical plate 705. Prior to substantial tightening of the screws extending into the bores 730, the second vertical plate may be rotatable relative to the first vertical plate 705 to change an angle of a surface of a T-shaped structure 740 of the second vertical plate 706 relative to the attachment plate 700 and base plate 900. Tightening of the screws extending into the bores 730 may prevent, due to increased friction, further shifting of the second vertical plate 706 relative to the first vertical plate 705 for changing the angle of the T-shaped structure 740 relative to the attachment plate 700 and base plate 900.

The mounting plate 750 may include a T-shaped bore 752 which may extend through the length of the mounting plate 750 on an underside of the mounting plate 750. The T-shaped structure 740 and the T-shaped bore 752 may be formed in a form-fitting manner so that the mounting plate 750 may be slid onto the second vertical plate 706 by extension of the T-shaped structure 740 through the T-shaped bore 752. It will be appreciated that other shapes may be used for the form-fitting structure of the vertical plate 706 and the bore of the mounting plate 750 which would allow for similar coupling of the mounting plate 750 to the vertical plate 706. The mounting plate 750 may further include bores 755 which may extend to the T-shaped bore 752 in a direction perpendicular to the T-shaped bore 752. After the mounting plate 750 is slid onto the vertical plate 706 as described above, the set screws may be inserted until they form a significant compressive stress against the T-shaped structure 740 to prevent further shifting of the mounting plate 750 relative to the vertical plate 706, and thereby prevent disengagement of the mounting plate 750 from the second vertical plate 706.

A tested device 115 may be attached, e.g., via double-backed adhesive tape, to the mounting plate 750. The mounting plate 750 may then be attached to the vertical plate 706 as described above. The entire fixture 114 may be placed in the workstation. e.g., the main workstation, in a predetermined position relative thereto, e.g., which may be ensured by coupling legs extending downward from an underside of the device fixture 114 into receiving bores of the of the platform 104. Alternatively, the device fixture 114 may include a plurality of holes, e.g., four holes, e.g., one in each corner, that are press fit over a corresponding plurality of e.g., four, custom posts with o-rings that are mounted on the platform of the workstation. Once placed, a user may determine whether any adjustments need be made. Adjustments may include shifting of the attachment plate 700 relative to the base plate 900, shifting of the base 702 within the window 710, and/or shifting of the second vertical plate 706 relative to the first vertical plate 705. In particular the angle of the second vertical plate 706 relative to the platform 104 may be adjusted to ensure that the display screen of the tested device 115 is substantially parallel to the camera 113.

Figure 9:
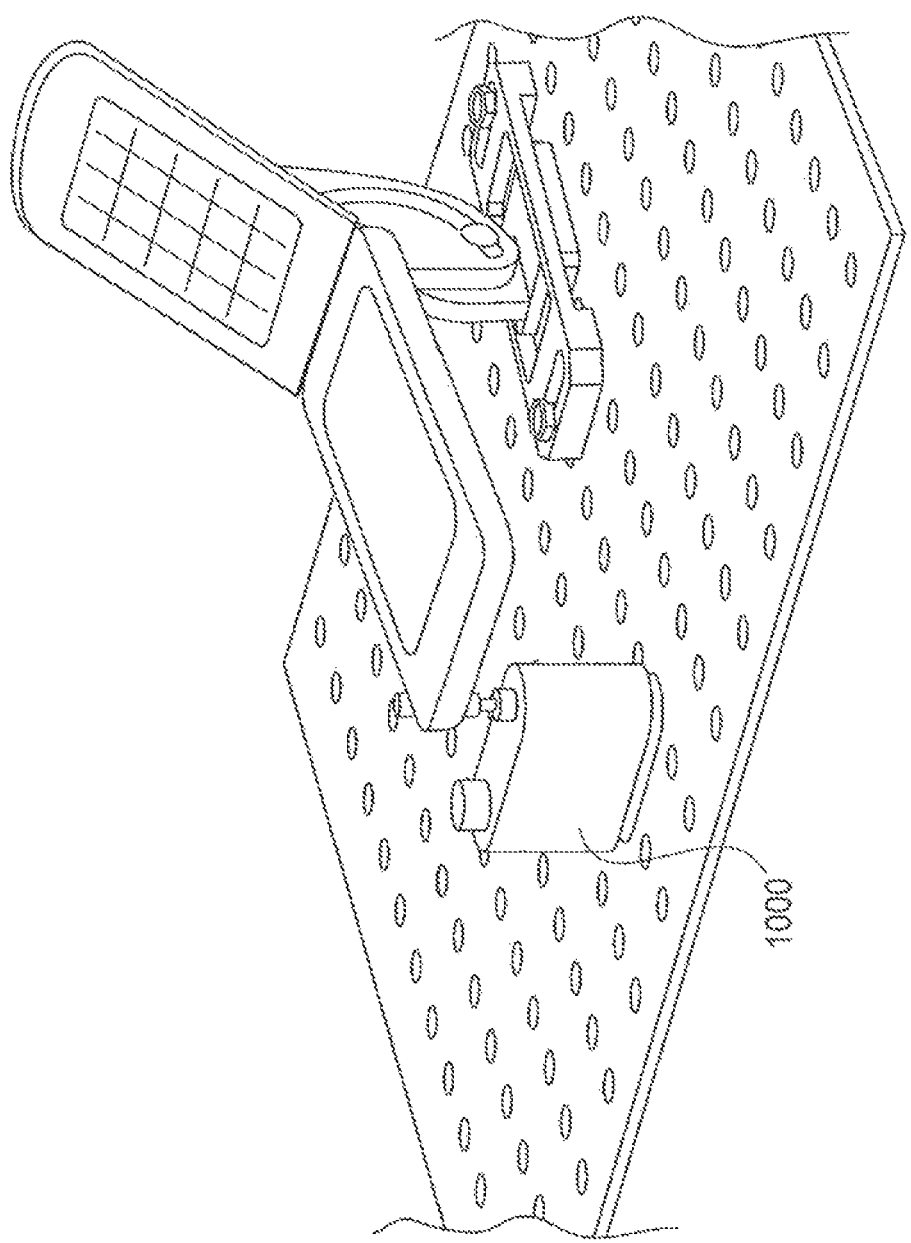
FIG. 9 shows a post which may be used to prevent torquing of a tested device, according to an example embodiment of the present invention.

A tested device 115 may include buttons on a side face of the tested device 115 on a portion of the tested device 115 including the display screen, so that a depression direction of the button extends parallel to a plane of the surface of the display screen. When the robot 102 depresses such a side button, a torquing force may be generated. To prevent the tested device 115 to torque, under such a force, a post 1000, e.g., as illustrated in FIG. 9, may be screwed into a bore 902 of the base plate 900 in a location such that the post 1000 contacts the tested device 115 at a side of the tested device 115 which is opposite that of the side on which the side button is located. If side buttons are located on both sides of the tested device 115, posts 1000 may be placed on both sides. If no side buttons are included, posts may be omitted.

Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A system, comprising:
    a first camera that has a first field of view and a first axis corresponding to the first field of view;
    a second camera that has a second field of view and a second axis corresponding to the second field of view, wherein the second field of view is wider than the first field of view;
    a memory storing expected testing results data;
    a platform supporting a tested handheld-communication device and a partner communication device, wherein at least a portion of a display screen of the tested handheld-communication device is in the first field of view of the first camera, wherein the first axis is approximately perpendicular with the display screen of the tested handheld-communication device, and wherein the second axis is non-perpendicular with the display screen;
    a robot arm to manipulate input hardware of the tested handheld-communication device; and
    a processor configured to:
        cause the robot arm to operate the tested handheld-communication device by manipulating the input hardware while the tested handheld-communication device is supported on the platform, wherein the manipulating the input hardware of the tested handheld-communication device causes the tested handheld-communication device to transmit a communication to the partner communication device;
        receive first images taken by the first camera during operation of the tested handheld-communication device;
        perform a comparison of the first images with the expected testing results;
        determine, based on the comparison, whether an error has occurred; and
        cause the memory to store second images, received from the second camera, of the tested handheld-communication device corresponding to a time period during which the error occurred.

2. The system of claim 1, wherein the second field of view of the second camera includes all of the display screen of the tested handheld-communication device.

3. The system of claim 1, wherein the display screen of the tested handheld-communication device is in better focus by the first camera compared with the second camera.

4. The system of claim 1, the processor further configured to perform optical character recognition (OCR) of one or more images of the display screen of the tested handheld-communication device to make a determination that the error has occurred.

5. The system of claim 1, wherein the tested handheld-communication device is positioned such that the display screen of the tested handheld-communication device is laterally shifted from the second axis extending through the lens of the second camera.

6. The system of claim 1, wherein the processor is further configured to:
    process at least one image received from at least one of the first camera or the second camera to identify a test sequence, and
    cause the robot arm to operate the tested handheld-communication device according to the test sequence.

7. The system of claim 1, wherein the processor is further configured to operate at least one light at a plurality of illumination levels during operation of at least one of the first camera and the second camera.

8. The system of claim 7, wherein the processor is further configured to identify at least one of a position of the display screen or a perimeter of the display screen based on a contrast between light produced by the display screen and ambient light.

9. The system of claim 1, wherein the system further comprises a compartment to enclose the tested handheld-communication device, the first camera, the second camera, the platform, and the robot arm.

10. The system of claim 1, wherein the tested handheld-communication device is fixedly mounted to the platform such that the tested handheld-communication device is provided substantially in a same initial position for each test.

11. A non-transitory computer-readable medium having stored program instructions that, when executed, cause a processor to perform a method to test a first handheld-communication device, the method comprising operations of:
    operating the first handheld-communication device and a second handheld-communication device according to a test sequence that causes communication between the first handheld-communication device and the second handheld-communication device;

capturing, using a first camera, first images of at least one of the first handheld-communication device;

capturing, using the second camera, second images of at least the first handheld-communication device and the second handheld-communication device, wherein a field of view of the second camera is greater than a field of view of the first camera;

comparing the first images with baseline images to make a determination that an error has occurred;

based on the determination that the error has occurred, storing at least a portion of the second images, the portion of the second images corresponding to a time period during which the error occurred;

wherein the first handheld-communication device is provided on a platform and a first axis extends through a lens of the first camera and approximately perpendicularly through the platform and a second axis extends through a lens of the second camera and non-perpendicularly through the platform.

12. The non-transitory computer-readable medium of claim 11, wherein the method further comprises performing optical character recognition (OCR) of at least one of the first images or the second images.

13. The non-transitory computer-readable medium of claim 11, wherein the first handheld-communication device is positioned such that a display screen of the first handheld-communication device is laterally shifted from the second axis extending through the lens of the second camera.

14. The non-transitory computer-readable medium of claim 11, wherein the method further comprises:
    processing at least one image received from at least one of the first camera or the second camera to identify a test sequence; and
    causing a robot arm to operate the first handheld-communication device according to the test sequence.

15. The non-transitory computer-readable medium of claim 10, wherein the method further comprises operating at least one light at a plurality of illumination levels during operation of at least one of the first camera and the second camera.

16. The non-transitory computer-readable medium of claim 15, wherein the method further comprises identifying at least one of a position and a perimeter of a display screen of the first handheld-communication device based on a contrast between light produced by the display screen and ambient light.

17. The non-transitory computer-readable medium of claim 11, wherein the first handheld-communication device is fixedly mounted to the platform such that the first handheld-communication device is provided substantially in a same initial position for each test.

* * * * *